(12) United States Patent
Crouse et al.

(10) Patent No.: US 11,157,337 B2
(45) Date of Patent: Oct. 26, 2021

(54) METHOD AND SYSTEM FOR PROCESSING A STREAM OF INCOMING MESSAGES SENT FROM A SPECIFIC INPUT MESSAGE SOURCE AND VALIDATING EACH INCOMING MESSAGE OF THAT STREAM BEFORE SENDING THEM TO A SPECIFIC TARGET SYSTEM

(71) Applicant: salesforce.com, inc., San Francisco, CA (US)

(72) Inventors: Steven Joseph Crouse, Halifax (CA); Charles Cox, Halifax (CA)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/259,826

(22) Filed: Jan. 28, 2019

(65) Prior Publication Data

US 2020/0241942 A1    Jul. 30, 2020

(51) Int. Cl.
*G06F 9/54*  (2006.01)
*H04L 12/58*  (2006.01)

(52) U.S. Cl.
CPC .............. *G06F 9/546* (2013.01); *G06F 9/544* (2013.01); *H04L 51/12* (2013.01); *G06F 2209/547* (2013.01); *G06F 2209/548* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |

(Continued)

*Primary Examiner* — Aaron N Strange
*Assistant Examiner* — Mohammad Yousuf A. Mian
(74) *Attorney, Agent, or Firm* — LKGlobal | Lorenz & Kopf, LLP

(57) ABSTRACT

Methods and systems are provided for processing a stream of incoming messages sent from a specific input message source and validating each incoming message of that stream before sending them to a specific target system.

19 Claims, 6 Drawing Sheets

(56) References Cited

U.S. PATENT DOCUMENTS

| | | |
|---|---|---|
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,160,092 B1 * | 4/2012 | Attig .................. G06F 8/35 370/458 |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0233516 A1 * | 12/2003 | Davis ................ H04L 69/22 711/108 |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud |
| 2004/0249854 A1 | 12/2004 | Barnes-Leon et al. |
| 2004/0260534 A1 | 12/2004 | Pak et al. |
| 2004/0260659 A1 | 12/2004 | Chan |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2007/0233709 A1 * | 10/2007 | Abnous .............. G06F 16/289 |
| 2008/0249972 A1 | 10/2008 | Dillon |
| 2009/0063414 A1 | 3/2009 | White et al. |
| 2009/0100342 A1 | 4/2009 | Jakobson |
| 2009/0171903 A1 * | 7/2009 | Lin .................. G06F 21/604 |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2012/0317566 A1 * | 12/2012 | Santos ............... G06F 9/45558 718/1 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2017/0374027 A1 * | 12/2017 | Fischer ............. H04L 63/0428 |
| 2018/0373663 A1 * | 12/2018 | Shanley ............ G06F 13/4045 |

\* cited by examiner

| A (V7) | B (V5) | C (V100) | D (V7) | E (V20) | F (V1) |
|---|---|---|---|---|---|

INCOMING MESSAGE WITH FIELDS A-F AND RESPECTIVE VALUES ()

| EXACT MATCH ||
|---|---|
| VALIDATION RULE | VALIDATION RESULT |
| ABXTDFY | FAIL |
| ABCDEF | PASS |
| ABCDEX | FAIL |

TABLE 1

| AT LEAST THIS ||
|---|---|
| VALIDATION RULE | VALIDATION RESULT |
| A(V7)B(V5)X(V100)T(V10)D(V7)F(V1)Y(V1) | FAIL |
| A(V7)B(V5)C(V100)D(V7)E(V20)F(V1)Y(V105) | FAIL |
| A(V7)B(V5)C(V100)D(V7)E(V20)F(V1)G(V7)H(V20) | FAIL |

TABLE 2

| AT MOST THIS ||
|---|---|
| VALIDATION RULE | VALIDATION RESULT |
| A(V7)B(V5)X(V5)T(V5)C(V100)D(V7)E(V20)F(V1) | PASS |
| A(V7)B(V5)C(V100)D(V7)E(V20)F(V1)Y(V3) | PASS |
| A(V7)B(V5)C(V100)X(V7)Y(V20)Z(V1) | FAIL |

TABLE 3

FIG. 3

```
faucets :
  - name : RetailEventPipeline
    type : com.salesforce.ccp.streamprocessor.stream.kafka.consumer.KafkaStreamConsumer parameters :
        groupId: ConsumerGroup1
        clientId: retailcalculator
        securityProtocol: MADDOG
        kafkaUrl: ajna0-broker1-0-prd.data.sfdc.net:9093
    replayIdManager :
        type: com.salesforce.ccp.streamprocessor.replaymanagers.kafka.KafkaReplayManager
    endpoints :
        -type: com.salesforce.ccp.streamprocessor.stream.kafka.endpoint.KafkaEndpoint
         name : Ajna
         parameters :
            groupId: GreasyGreaseTrap
            clientId: retailcalculator
            securityProtocol: MADDOG
            kafkaUrl: ajna0-broker1-0-prd.data.sfdc.net:9093
        - type: com.salesforce.ccp.streamprocessor.stream.http.endpoint.HttpEndpoint
          name : SalesforceSuperTenants
          parameters :
            baseUrl : https://login.salesforce.com
    subscriptions :
        - topic : sdfc.prod.cj__prd.ajna_local__cj_abandonedcarts
          eventValidation: ──402
            parameters : ──404
                                      ──406
                allowExtraFields : false
                ignoreMissingFields: false ──408
            matchers : ──410
                consumerid: "#value matches ' [ a-zA-Z0-9 ]{26} ' " ──412
                siteid: "#value matches ' \\w{1,60} ' " ──414  ──416
                cartid : "#value matches ' [a-zA-Z0-9] {26} ' "
                activitydate: "#value matches '^(\\d{4}-\\d{2}-\\d{2}T\\d{2}:\\d{2}:\\d{2}(\\.\\d{3})?)$' " ──418
                messageidentifier: "#value == null || #value matches ' . * ' " ──420
```

FROM FIG.4A

```
messageConsumer :
    type : com.salesforce.ccp.streamprocessor.messageconsumers.buffered.BufferedMessageConsumer
    retryAction :
        type : com.salesforce.ccp.streamprocessor.resiliance.retry.action.DefaultMessageConsumerRetryAction
        retryConfig :
            maxAttempts: 3
            waitDuration: 250
    handler :
        type: com.salesforce.ccp.streamprocessor.messagehandlers.transform.TransformingMessageHandler
        parameters :
            destination : " /services/data/v42.0/sobjects/AbandonedCart__e/ "
            routingKeyField : ${siteid}
            transformationRules :
                CartId__c : ${cartid}
                SiteId__c : ${siteid}
                ConsumerId__c : ${consumerid}
                ActivityDate__c : ${activitydate}
                MessageIdentifier__c : ${messageidentifier}
    drains : [SalesforceSuperTenamts]
    deadLetterDrain : Ajna
    deadLetterDestination : sfdc.prod.cj__prd.ajna_local__cj_deadletter
```

FIG. 4B

METHOD AND SYSTEM FOR PROCESSING A STREAM OF INCOMING MESSAGES SENT FROM A SPECIFIC INPUT MESSAGE SOURCE AND VALIDATING EACH INCOMING MESSAGE OF THAT STREAM BEFORE SENDING THEM TO A SPECIFIC TARGET SYSTEM

TECHNICAL FIELD

Embodiments of the subject matter described herein relate generally to processing message streams. More particularly, embodiments of the subject matter relate to methods and systems for processing a stream of incoming messages sent from a specific input message source and validating each incoming message of that stream before sending them to a specific target system.

BACKGROUND

Stream processing technology allows users to query large continuous data streams and detect conditions quickly within a small-time period from the time of receiving the data. Stream processing engines (or stream processors) can be used to process various types of electronic information such as signals, events, messages, etc.

For example, event stream processing is the process of quickly analyzing time-based data as it is being created and before it's stored. An event is anything that happens at a clearly defined time and that can be specifically recorded. An event stream is a sequence of events ordered by time. Processing is the final act of analyzing all of this data. As such, event stream processing is the process of being able to quickly analyze data streaming from one device to another at an almost instantaneous rate after it's created. The ultimate goal of event stream processing deals with identifying meaningful patterns or relationships within all of these streams in order to detect things like event correlation, causality, or timing. Event stream processing completely changes the order of the entire analytics procedure, allowing for faster reaction time and even providing an opportunity for proactive measures before a situation is over. Processing data in this way is extremely advantageous as the system doesn't have to remember many events thereby using very little memory.

Message stream processing is a special form of event stream processing where the events being processed are messages.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 3 is an illustrative example of an incoming message with fields A through F, and respective values for each field and three tables that each include various validation rules in its first column and corresponding validation results in its second column when a validation rule from column 1 is applied to the incoming message.

FIGS. 4A and 4B are collectively a block of code that illustrates a set of code-based validation rules that can be specified that define a declarative message stream validation pipeline that is to be applied to validate incoming messages.

DETAILED DESCRIPTION

Figure 1:
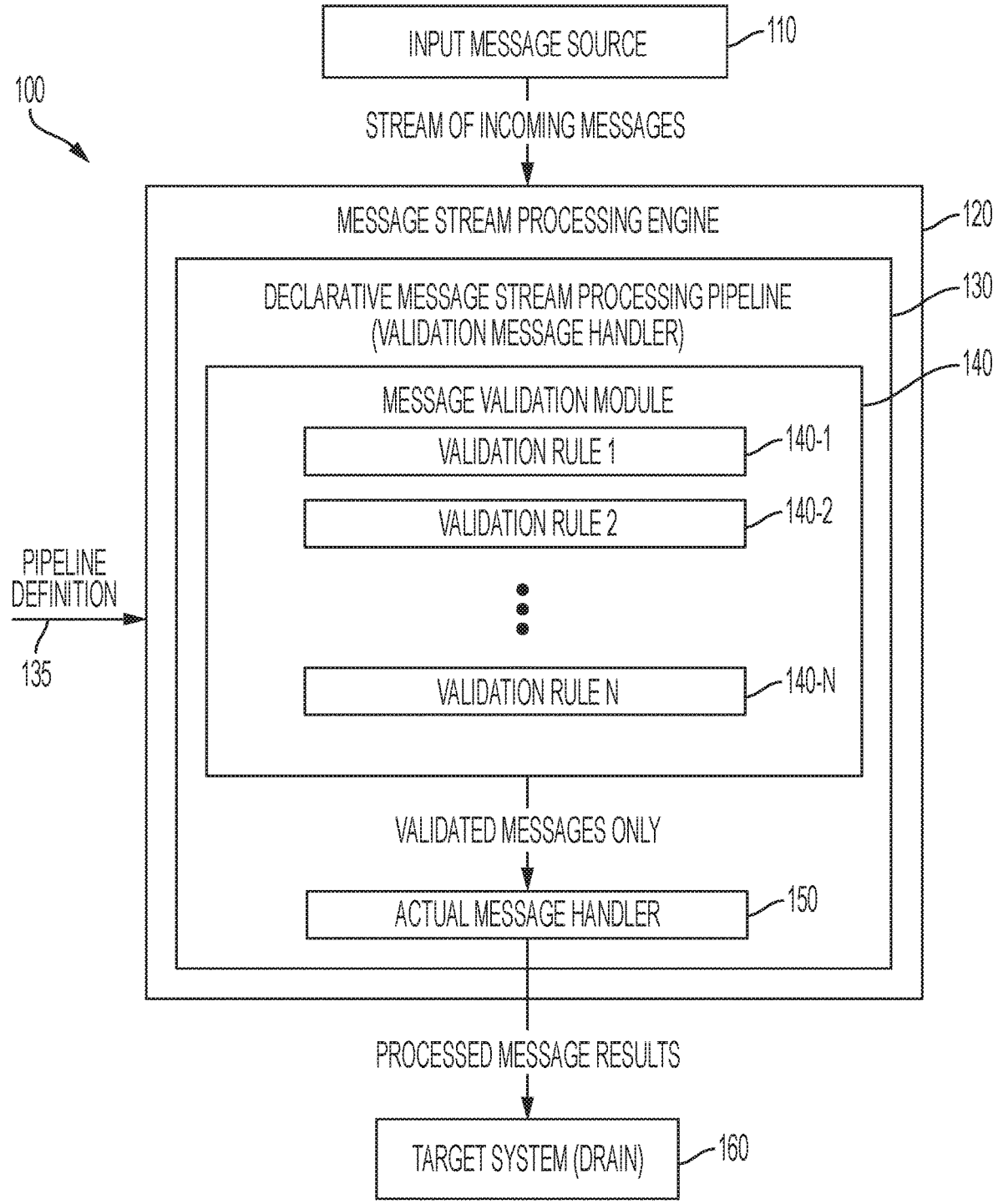
FIG. 1 is a block diagram of a message processing system in accordance with the disclosed embodiments.

In some cases, unwanted messages may be introduced into the stream processing engine. For example, invalid or malicious messages can sometimes be injected into the message stream with data that would cause unexpected, or even problematic results. In other cases, it may be desirable to filter out messages that do not meet specific criteria. For example, messages containing a phone number outside of a specific area code might be filtered out for one reason or another. For those reason, it would be desirable to provide an efficient way to validate messages in an incoming message stream before they are processed.

The exemplary embodiments presented here relate to systems, methods, procedures, and technology for processing a stream of incoming messages sent from a specific input message source and validating each incoming message of that stream before sending them to a specific target system. The disclosed embodiments can allow for schema and payload validation of messages in a loosely-typed declarative stream processing pipeline. This sort of validation is an integral part of ensuring the resilience and functionality of the pipeline in case of invalid or malicious messages are received at the stream processing engine. By allowing for a declarative method of defining the validation rules to be applied as part of the overall message processing definition, the runtime creation of the pipeline components can be optimized, while keeping a clear and easily human-readable syntax for the stream processing pipeline. Additionally, by keeping the schema and payload validation rules bound to the pipeline definition, the need for involving external schema management systems (e.g., Apache Avro) can be eliminated, while also allowing allow the pipeline itself to be rapidly designed and implemented without forcing strict typing constraints onto the system.

As will be described in greater detail below, a pipeline definition describes the source of incoming messages, an action to be performed on each message by a message handler, and a target system for any outbound results of the message processing (the "drain"). Additionally, as part of the message subscription, a series of validation rules are declared that will be applied to each incoming message. The validation step must succeed in order for the message to be processed by the declared message handler.

By defining the pipeline in this declarative fashion, a stream processing engine can be used that accepts this pipeline definition as input and assembles an instantiated pipeline at runtime. At that point it's simply a matter of starting up the pipeline and allowing it to process messages based on the declared configuration. At runtime the components necessary to process a stream of messages from an input source and constructed and arranged logically. Depending on the specific pipeline declaration, behavior modifying wrappers can be automatically injected around certain components in order to perform tasks like schema and payload validation without forcing developers to re-implement that logic over and over. In the case of schema and payload validation this is implemented by injecting a message validation handler into the instantiated pipeline that performs the message validation and then, if the validation succeeds, delegates to the "real" message handler that implements actual business logic or actions on the messages that are successfully validated (i.e., that satisfy each of the validation rules).

In one embodiment, a method and system are provided for processing a stream of incoming messages sent from a specific input message source and validating each incoming message of that stream before sending them to a specific target system. A set of code-based validation rules are specified that define a declarative message stream validation pipeline that is to be applied to validate incoming messages. The set of code-based validation rules are run-time components of the declarative stream processing pipeline that are collectively be used to validate each of the incoming messages when all of the code-based validation rules are satisfied. Each rule in the set of code-based validation rules is declaratively defined to specify a rule that an incoming message must comply with to be successfully validated. The payload of each incoming message includes a set of fields each having a value, where the set of fields is a schema for that incoming message. The set of code-based validation rules are collectively used to validate a payload of each incoming message to confirm that the payload satisfies criteria for each of the code-based validation rules.

Some of the set of code-based validation rules can be schema validation rules that are used to specify a constraint about a schema of each incoming message that must be satisfied for that incoming message to be successfully validated. The schema defines, for example, a structure and type of contents for each data element within the incoming message. With schema validation rules, a schema of each incoming message is evaluated to ensure compliance with the schema validation rule. Each schema validation rule can define either: one or more fields that are required to be present in each incoming message, one or more fields that are allowed to be present in each incoming message, and/or one or more fields that are not allowed to be present in each incoming message. For example, an "exact match" schema can be used to declare that schema of an incoming message must exactly match a schema defined by that validation rule for validation to be successful. By contrast, an "at least" schema declares that an incoming message must include fields defined in the validation rule for validation of the incoming message to be successful, and that the incoming message is permitted to include other fields not defined in the validation rule while still allowing for validation of the incoming message to be successful. As another example, an "at most" schema declares that any fields in an incoming message must exist in and conform to the validation rule for validation of the incoming message to be successful, and that not all fields declared in the validation rule are required to exist in the incoming message for validation of the incoming message to be successful.

Other code-based validation rules, that can be used in conjunction with one or more of the schema validation rules, are field value validation rules. Each of the field validation rules are used to define a constraint about a value for at least one field of each incoming message that must be satisfied for that incoming message to be successfully validated. With field value rules, a value for at least one field of each incoming message is evaluated to ensure compliance with each field value validation rule.

The declarative message stream validation pipeline is specified for the specific input message source and the specific target system. To explain further, a message stream processing engine (described below) is configurable to operate with a number of different input message sources and a number of different target systems. For example, the input message source could be a message queue, message broker software, a log file, an Application Programming Interface (API) endpoint, or a distributed stream-processing platform, etc. Similarly, the target system could be another message queue, another log file, another Application Programming Interface (API) endpoint, or a database table that the processed message results are to be inserted into, etc. Each combination of a specific input message source and a specific target system corresponds to a specific pipeline definition that is used to define a specific instance of the declarative message stream validation pipeline that is to be applied to validate incoming messages from the specific input message source to the specific target system. Each specific instance of the declarative message stream validation pipeline comprises a specific set of code-based validation rules that that are declaratively defined for that particular combination of the specific input message source and the specific target system.

During run-time, the message stream processing engine can instantiate the declarative message stream validation pipeline, and then apply the set of code-based validation rules to each incoming message that is received to either validate or invalidate each incoming message. In one embodiment, the message stream processing engine receives a message validation module for a pipeline definition having a declared configuration for the combination of the specific input message source and the specific target system. The message validation module includes the set of code-based validation rules that define the declarative message stream validation pipeline. The message stream processing engine can load the message validation module at run-time to assemble, based on the pipeline definition, the declarative stream processing pipeline, and then execute the message validation module to evaluate each of the incoming messages against each of the set of code-based validation rules to either validate or invalidate each incoming message. Each incoming message that satisfies each of the set of code-based validation rules is successfully validated. Each incoming message that satisfies all of the validation rules is validated and output to the message handler (e.g., only the incoming messages that were successfully validated are then output to the message handler). Other incoming messages that fail to satisfy one of the set of code-based validation rules are invalidated (e.g., blocked, discarded and/or quarantined) such that those other incoming messages are prevented from being output to and processed at the message handler.

Each incoming message that was successfully validated (or "validated message") can then be processed at a message handler of the message stream processing engine to transform that incoming message into a processed message result. Each processed message result corresponds to one of the incoming messages that has been successfully validated. The message handler can then send each of the processed message results to the specific target system.

The message stream processing engine can be implemented using hardware-based processor(s) and memory (or other non-transitory, computer-readable medium) that includes processor-executable instructions encoded on a non-transient processor-readable media. The processor-executable instructions, when executed by the hardware-based processor(s) during run-time, cause the system to perform various operations and steps described above to process a stream of incoming messages sent from a specific combination of input message source and target system FIG. 1 is a block diagram of a message processing system 100 in accordance with the disclosed embodiments. The message processing system 100 includes an input message source 110, a message stream processing engine 120, and a target system 160 (or drain).

The input message source 110 can be any source that provides a stream of incoming messages to the message stream processing engine 120. The input message source 110 can vary depending on the implementation. For example, the input message source 110 may be a computing system such as a computer, a computing device, a computer server, a plurality of computer servers, or other computing device that is capable of executing computer-executable instructions, applications, application software, computer-executable routines or codes. In another embodiment, the input message source 110 includes a plurality of such computing systems in a distributed system in which the computing systems are connected by a common communication network, such as an intranet, an internet, or the like.

In one implementation, the input message source 110 can be a message queue. A message queue is a form of asynchronous service-to-service communication used in serverless and microservices architectures. Messages are stored on the queue until they are processed and deleted. Each message is processed only once, by a single consumer. Message queuing allows applications to communicate by sending messages to each other. The message queue provides a temporary message storage when the destination program is busy or not connected. The basic architecture of a message queue includes client applications called producers that create messages and deliver them to the message queue, and another application, called a consumer, that connects to the queue and gets the messages to be processed. Messages are placed onto the queue are stored until the consumer retrieves them. A message queue provides an asynchronous communications protocol. This means that a system that puts a message onto a message queue does not require an immediate response to continuing processing. Email is an example of asynchronous messaging. When an email is sent can the sender continue processing other things without an immediate response from the receiver. This way of handling messages decouples the producer from the consumer. The producer and the consumer of the message do not need to interact with the message queue at the same time. Some implementations of message queues allow the passing of messages between different computer systems, potentially connecting multiple applications and multiple operating systems.

In another implementation, the input message source 110 can be message broker software, such as RabbitMQ. A message broker (also known as an integration broker or interface engine) is an intermediary computer program module that translates a message from the formal messaging protocol of the sender to the formal messaging protocol of the receiver. Message brokers are elements in telecommunication or computer networks where software applications communicate by exchanging formally-defined messages. Message brokers are a building block of message-oriented middleware (MOM). A message broker defines an architectural pattern for message validation, transformation, and routing. It mediates communication among applications, minimizing the mutual awareness that applications should have of each other in order to be able to exchange messages, effectively implementing decoupling. The primary purpose of a broker is to take incoming messages from applications and perform some action on them. Message brokers can decouple end-points, meet specific non-functional requirements, and facilitate reuse of intermediary functions. For example, a message broker may be used to manage a workload queue or message queue for multiple receivers, providing reliable storage, guaranteed message delivery and transaction management. Other examples of actions that might be handled by a message broker can include, for example: routing messages to one or more destinations; transforming messages to an alternative representation; performing message aggregation, decomposing messages into multiple messages and sending them to their destination, then recomposing the responses into one message to return to the user; interacting with an external repository to augment a message or store it; invoking web services to retrieve data; responding to events or errors; providing content and topic-based message routing using the publish-subscribe pattern, etc.

Message brokers are generally based on one of two fundamental architectures: hub-and-spoke and message bus. In the first, a central server acts as the mechanism that provides integration services, whereas with the latter, the message broker is a communication backbone or distributed service that acts on the bus. Additionally, a more scalable multi-hub approach can be used to integrate multiple brokers.

RabbitMQ is an open source message broker software (sometimes called message-oriented middleware) that originally implemented the Advanced Message Queuing Protocol (AMQP) and has since been extended with a plug-in architecture to support Streaming Text Oriented Messaging Protocol (STOMP), Message Queuing Telemetry Transport (MQTT), and other protocols.

In another implementation, the input message source 110 could be a log file generated by a computing system. A log file is a file that records either events that occur (e.g., in an operating system or other software runs), or messages between different users of communication software. For example, a transaction log file is a file of the communications (i.e., transactions) between a system and the users of that system, or a data collection method that automatically captures the type, content, or time of transactions made from a system.

As another example, event logs record events taking place in the execution of a system in order to provide an audit trail that can be used to understand the activity of the system and to diagnose problems. They are essential to understand the activities of complex systems, particularly in the case of applications with little user interaction (such as server applications). Most database systems maintain some kind of transaction log, which are not mainly intended as an audit trail for later analysis, and are not intended to be human-readable. These logs record changes to the stored data to allow the database to recover from crashes or other data errors and maintain the stored data in a consistent state. Thus, database systems usually have both general event logs and transaction logs.

As yet another example, message logs keep track of messages communicated between systems. For example, Internet Relay Chat (IRC), instant messaging (IM) programs, peer-to-peer file sharing clients with chat functions, and multiplayer games (especially MMORPGs) commonly have the ability to automatically log (i.e. save) textual communication, both public (IRC channel/IM conference/MMO public/party chat messages) and private chat messages between users.

In another implementation, the input message source 110 could be an Application Programming Interface (API) endpoint, such as an HTTP API endpoint. An Application Programming Interface (API) allows two systems to communicate with one another. An API essentially provides the language and contract for how two systems interact. Each API has documentation and specifications which determine how information can be transferred. Companies leverage APIs to transfer vital information, processes, transactions, and more. An endpoint is one end of a communication channel. When an API interacts with another system, the touchpoints of this communication are considered API endpoints. To explain further, APIs work using 'requests' and 'responses.' For example, APIs can use HTTP requests to get information from a web application or web server. When an API requests information from a web application or web server, it will receive a response. The place that an API sends a request to, and where the resource lives, is called an endpoint. Endpoints specify where resources can be accessed by APIs. For APIs, an endpoint can include a URL of a server or service. Each endpoint is the location from which APIs can access the resources they need to carry out their function.

In yet another implementation, the input message source 110 could be a distributed stream-processing platform, such as Kafka® developed by the Apache Software Foundation. A streaming platform can publish and subscribe to streams of records (e.g., similar to a message queue or enterprise messaging system); store streams of records in a fault-tolerant durable way; and process streams of records as they occur. Kafka® is an open-source, real-time publish-subscribe messaging framework that is used for building real-time data pipelines and distributed stream processing applications. Kafka is generally used, for example, in building real-time streaming data pipelines that reliably get data between systems or applications, and/or in building real-time streaming applications that transform or react to the streams of data. Kafka is run as a cluster on one or more servers that can span multiple datacenters. The Kafka cluster stores streams of records in categories called topics. Each record consists of a key, a value, and a timestamp. Kafka has four core APIs: a Producer API allows an application to publish a stream of records to one or more Kafka topics; a Consumer API allows an application to subscribe to one or more topics and process the stream of records produced to them; a Streams API allows an application to act as a stream processor, consuming an input stream from one or more topics and producing an output stream to one or more output topics, effectively transforming the input streams to output streams; and a Connector API allows building and running reusable producers or consumers that connect Kafka topics to existing applications or data systems. For example, a connector to a relational database might capture every change to a table. In Kafka the communication between the clients and the servers is done with a simple, high-performance, language agnostic TCP protocol. This protocol is versioned and maintains backwards compatibility with older version.

Regardless of the implementation, the input message source 110 outputs a stream of incoming messages that are received by the message stream processing engine 120. In general terms, the message stream processing engine 120 is a stream processing engine (or stream processor) that takes in continual streams of data from an input message source 110 (sometimes called input topics), performs some processing on this input, and produces continual streams of data to a target system 160 (sometimes called output topics.)

In accordance with the disclosed embodiments, the message stream processing engine 120 can process a stream of incoming messages (as opposed to other types of processing engines that process batches of messages). Examples of general-purpose stream processing engines that are commonly used can include, for example, Kafka® Streams, Spring Cloud® Stream, etc. Kafka® Streams is a client library for building applications and microservices, where the input and output data are stored in Kafka clusters. Spring Cloud Stream is a framework for building highly scalable event-driven microservices connected with shared messaging systems.

The message stream processing engine 120 can be configured to work with a number of different input message sources 110 and a number of different processing target systems 160 (or drains). For example, in one implementation, the input message source 110 can be a HTTP endpoint that clients periodically push data into and the target system 160 (or drain) can be an API endpoint. In another example implementation, the input message source 110 can be a Kafka topic and the target system 160 (or drain) can be another Kafka topic. As will be explained below, for each combination of a specific input message source 110 and a specific target system 160, a pipeline definition 135 can be used to define a declarative message stream validation pipeline that is to be applied to validate messages from the specific input message source to the specific target system. Each declarative message stream validation pipeline can include a specific set of code-based validation rules that that are declaratively defined (and re-defined as needed) for a particular combination of the specific input message source 110 and the specific target system 160.

In accordance with the disclosed embodiments, the message stream processing engine 120 can execute (at run-time) a declarative stream processing pipeline 130 that allows for a set of declaratively defined validation rules to be applied as part of the overall message processing performed by the message stream processing engine 120 to validate incoming messages. As will be described in greater detail below, the declarative stream processing pipeline 130 allows for the run-time creation of the pipeline validation rules to be optimized, while keeping a clear and easily human readable syntax. In addition, because the validation rules are bound to the definition of the declarative stream processing pipeline 130, the need for external schema management systems can be eliminated. This also allows for the pipeline declarative stream processing pipeline 130 to be rapidly designed and implemented without forcing strict typing constraints onto the system.

At run-time, the message stream processing engine 120 receives a pipeline definition 135 having a declared configuration, and based on the pipeline definition 135, assembles/instantiates a declarative stream processing pipeline 130. The declarative stream processing pipeline 130 can load and execute a message validation module 140 for the pipeline definition. The message validation module 140 can include any number of validation rules 140-1 . . . 140-*n*. In generalized terms, the validation rules are run-time components of the declarative stream processing pipeline 130 that can collectively be used to validate incoming messages (e.g., if all validation rules are satisfied). This can, for example, help prevent invalid or malicious messages from passing through the pipeline 130 and processed by the message handler 150.

Each validation rule is code-based and defined declaratively. This allows the validation rules to be very explicitly defined. As used herein, a "validation rule" can refer to a rule that is used to validate that a payload of a message matches certain criteria (e.g., that the payload being validated matches one or more criteria). The payload of a message is composed of a set of fields. A specific set of fields is a schema. A validation rule can be used to specify or define which fields of a message are required, optional or not permitted. As an example, the validation rules 140-1 . . . 140-*n* can be used to specify which fields of a message are required to be part of the message, which fields of a message may optionally be part of the message, and which fields of a message are not allowed to be present in the message. For example, each field of a message can be evaluated to validate that a value for that field complies with the programmatic rule defined for it.

Each validation rule can be used to specify/declare a rule that an incoming message must comply with. For instance, a validation rule might be used to specify a list of fields that are required to be present in a message. Another validation rule might be used to specify one or more fields that are allowed to be present in a message, but are not required to be present in the message. Another validation rule might be used to specify one or more fields that are allowed to be present in a message, and one or more other fields that are required to be present in the message.

In one embodiment, there are two basic types of validation rules: (1) schema validation rules that are defined and used to define a constraint about either the schema (or overall payload of the message), and/or (2) field value validation rules that are defined and used to define a constraint about values for individual fields of the message. Different combinations of validation rules can be used to perform one or more of: (1) schema validation, and (2) field value validation. In general, an incoming message must comply with one of three different types of validation rules.

An "exact match" or "exactly this" schema declares that the schema of an incoming message being processed must exactly match a schema defined by the validation rule in order for validation to be successful. A schema defines the structure and/or the type of contents that each data element within a message or message segment.

An "at least this" schema declares that an incoming message being processed must include, at a minimum, the fields defined in the validation rule (in order for validation to be successful), but that the message may optionally include more fields (while still allowing for validation of the message to be successful).

An "at most this" schema declares that any fields in an incoming message being processed must exist in and conform to the validation rule (in order for validation to be successful), but that not all fields declared in the validation rule are required to exist in the message (in order for validation to be successful).

Each of the validation rules are applied to incoming messages at run-time to evaluate incoming messages. The declarative stream processing pipeline 130 executes the validation rules 140-1 . . . 140-*n* of the message validation module 140 against each message is received. Any message that satisfies all the different validation rules 140-1 . . . 140-*n* (applied via the message validation module 140) is a "validated" message. Only the validated messages are output to the message handler 150. The message validation module 140 can discard or quarantine any "invalid" messages (i.e., any messages that fail one or more of the validation rules).

The message handler 150 can then process each validated message to transform it into a processed message result that corresponds to that validated message. Depending on the implementation, the action or business logic to be performed by the message handler 150 with respect to each validated message (to generate desired processed message results) can vary greatly. For example, in one implementation, where the incoming message that was validated is a signal that the user of an ecommerce website had made an online purchase, the message handler 150 can then process that validated message to generate an API request to an email service to send an order confirmation email. As another example, in one implementation, where the incoming message that was validated is an entry in an application log file, the message handler 150 can then process that validated message to generate an insert statement that stores fields from the log message into a database table. As yet another example, in one implementation, where the incoming message that was validated is a set of performance metrics generated as part of a long running processing job, the message handler 150 can then process that validated message to generate aggregated summary metrics that are output to a separate file for long term persistence. As another example, the system could listen for messages on Kafka topic ABC, ensure that each message conforms to the validation rules, transform the message from Q→Z and send it to Kafka topic XYZ. These examples are non-limiting and the transformation that could be applied by the message handler 150 can be any transformation to transform the validated, incoming message into a different processed message result that corresponds to that message.

The processed message results that are generated by the message handler 150 (if any) are then sent to the target system 160. The target system 160 can vary depending on the implementation, and can be anyone of the computing systems mentioned above with respect to the input message source 110. For example, in one implementation, the target system 160 can be another message queue. In another implementation, the target system 160 could be another log file. In another implementation, the target system 160 could be another HTTP API endpoint. In yet another implementation, the target system 160 could be a database table that the processed message results are to be inserted into.

Figure 2:
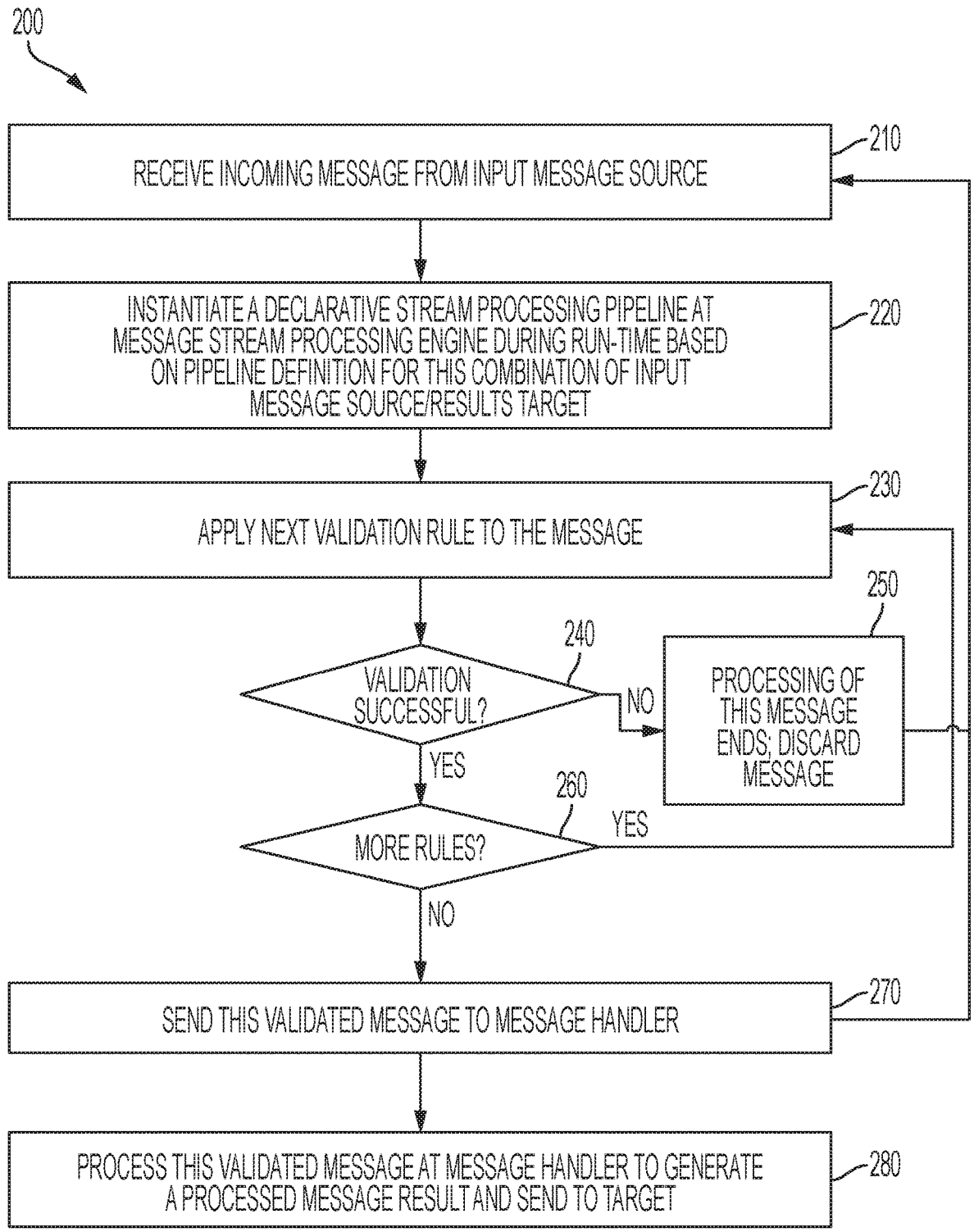
FIG. 2 is a method for processing a stream of incoming messages sent from a specific input message source and validating each incoming message of that stream before sending them to a specific target system in accordance of the disclosed embodiments.

FIG. 2 is a method 200 for processing a stream of incoming messages sent from a specific input message source and validating each incoming message of that stream before sending them to a specific target system in accordance of the disclosed embodiments. The method 200 begins at step 210 when an incoming message is received from an input message source. The method then proceeds to 220, where a declarative stream processing pipeline is created at run-time based on a pipeline definition for this particular combination of input message source and target system. The method 200 then proceeds to 230 where the system begins applying validation rules to the incoming message. As noted above there could be any number of validation rules depending on the implementation. On the first iteration through the method 200, the first validation rule is applied to the incoming message at 230. At 240, it is determined whether the incoming message passed the validation rule, or in other words, whether validation of that incoming message was successful against that particular validation rule. When it is determined at 240 that validation was unsuccessful, the method proceeds to step 250, and processing of this incoming message ends because the incoming message did not satisfy the validation rule was applied at 230, and further processing of the incoming message is done and it can be invalidated, blocked, discarded, etc.

By contrast, when it is determined at 240 that validation was successful (i.e., that the incoming message did satisfy the validation rule that was applied at 230), the method 200 proceeds to step 260, where the system determines whether there are any more validation rules to be applied. When is determined at 260 that there are more validation rules to apply to the incoming message, the method 200 loops back to step 230, where the system applies the next validation rule to the message. When it is determined at 260 that there are no more validation rules to apply to the incoming message, the method 200 proceeds to step 270, where the system sends the validated message to the message handler for further processing.

At step 280, the message handler processes this validated message to generate a processing result, and then sends the processing result to the target system. Following step 270, the method 200 then loops back to step 210 where the next incoming message received from the input message source is received and processed as described above.

As such, only those messages that successfully satisfy all the validation rules that are applied will be sent to the message handler, and any message it does not satisfy one or more of the validation rules will not be sent to the message handler for further processing because there will be a "no" decision at step 240.

FIG. 3 is an illustrative example of an incoming message with fields A through F, and respective values for each field. For example, field A includes the value the v7, field B includes the value V5, field C includes the value V100, field D includes the value V7, field E includes the value V20, and field F includes the value V1. FIG. 3 also includes three tables. Each table includes validation rules in its first column and corresponding validation results in its second column when a validation rule from column 1 is applied to the incoming message (described above).

In this example, Table 1 illustrates three different examples of "exact match" type validation rules with no field value validation rules imposed. In other words, in the example in Table 1, the validation rule is a schema validation rule with no field value validation rules imposed. As shown in Table 1, when the exact match schema validation rule ABXTDFY is applied to the incoming message, the result will be invalid/fail because the message includes fields C and E and is missing fields X T and Y. By contrast, when the exact match schema validation rule ABCDEF is applied to the incoming message, the validation result will be valid/pass because the incoming message includes exactly the same fields ABCDEF that are required by the validation rule. Finally, when the exact match schema validation rule ABCDEX is applied to the incoming message, the validation result will be invalid/fail because the incoming message includes a field F, but does not include a field X as required by the validation rule for an exact match.

Table 2 illustrates three different examples of "at least this" type validation rules with field value validation rules imposed (as indicated in brackets ( )). As shown in Table 2, when an at least this schema validation rule with various field value validation rules A(V7)B(V5)X(V100)T(V10)D(V7)F(V1)Y(V1) are applied to the incoming message A(V7)B(V5)C(V100)D(V7)E(V20)F(V1), the result will be invalid/fail because the message does not include the fields X, T and Y as required by the schema validation rule, and does not include values V100 for field X, V10 for field T and value V1 for field Y as required by the field value validation rules.

When the at least this validation rule with various field value validation rules A(V7)B(V5)C(V100)D(V7)E(V20)F(V1)Y(V105) are applied to the incoming message A(V7)B(V5)C(V100)D(V7)E(V20)F(V1), the validation result will be invalid/fail because the incoming message does not include field Y as required by the schema validation rule, and does not include the value V105 for field Y as required by one of the field value validation rules.

Finally, when the at least this validation rule with various field value validation rules A(V7)B(V5)C(V100)D(V7)E(V20)F(V1)G(V7)H(V20) are applied to the incoming message A(V7)B(V5)C(V100)D(V7)E(V20)F(V1), the validation result will also be invalid/fail because the incoming message does not include G(V7) or H(V20) as required by the validation rules. does not include the fields G and H as required by the schema validation rule, and does not include values V7 for field G and value V20 for field H as required by the field value validation rules Although not illustrated, when an at least this validation rule with various field value validation rules A(V7)B(V5)D(V7)F(V1) are applied to the incoming message A(V7)B(V5)C(V100)D(V7)E(V20)F(V1), the result will be valid/pass because the message does include all the fields and all the values required by the validation rules plus additional fields and values that are not prohibited.

By contrast, when an at least this schema validation rule with various field value validation rules A(V7)B(V10)D(V7)F(V1) are applied to the incoming message A(V7)B(V5)C(V100)D(V7)E(V20)F(V1), the result will be invalid/fail because even though the message does all the fields required by the schema validation rule, the value V5 of field B in the incoming message is different than the value V10 that is required by that field value validation rule.

Table 3 illustrates three examples of "at most this" type validation rules with field value validation rules imposed (as indicated in brackets ( )). As shown in Table 3, when an at most this schema validation rule with various field value validation rules A(V7)B(V5)X(V5)T(V5)C(V100)D(V7)E(V20)F(V1) are applied to the incoming message A(V7)B(V5)C(V100)D(V7)E(V20)F(V1), the result will be valid/pass because all of the fields in the message exist in the schema validation rule and all of the values required by the various field value validation rules are matches.

When an at most this schema validation rule with various field value validation rules A(V7)B(V5)C(V100)D(V7)E(V20)F(V1)Y(V3) are applied to the incoming message A(V7)B(V5)C(V100)D(V7)E(V20)F(V1), the result will be valid/pass because all of the fields in the message exist in the schema validation rule and all of the values required by the various field value validation rules are matches.

When an at most this schema validation rule with various field value validation rules A(V7)B(V5)C(V100)X(V7)Y(V20)Z(V1) are applied to the incoming message A(V7)B(V5)C(V100)D(V7)E(V20)F(V1), the result will be invalid/fail because all of the fields in the message do not exist in the schema validation rule (i.e., fields D, E and F are not in the schema validation rule) and all of the values for fields X, Y and Z that are required by the various field value validation rules are not present in the message because it lacks those fields.

The examples in FIG. 3 are non-limiting, and it should be appreciated that the different types of schema validation rules can be combined with or without field value validation rules applied to some, all, or none of the fields. Further, there is no requirement that the field value validation rules be used in conjunction with a field specified in a schema validation rule (as done in the examples in Table 2 and Table 3). Likewise, field value validation rules be used in conjunction with only some of the fields specified in a schema validation rule. In addition, the different schema validation rules can be combined and used together to validate messages. For example, an exact match could be required for certain parts of a message, whereas other parts of the message could require compliance with an at least this validation rule and/or an at most this validation rule. The end result is code-based, declarative method for specifying what the payload of a message needs in order to be successfully validated and passed on to the actual message handler for processing.

FIGS. 4A and 4B are collectively a block of code that illustrates a set of code-based validation rules 404-420 that can be specified that define a declarative message stream validation pipeline that is to be applied to validate incoming messages. In this non-limiting example, the declarative message stream validation pipeline has been configured and specified for incoming messages from a Kafka topic (i.e., the specific input message source) to an API endpoint (i.e., the specific target system).

The set of code-based validation rules 404-420 are runtime components of the declarative stream processing pipeline that are collectively be used to validate each of the incoming messages if all of the code-based validation rules are satisfied. The payload of each incoming message includes a set of fields each having a value, where the set of fields is a schema for that incoming message. The set of code-based validation rules 404-420 are collectively used to validate a payload of each incoming message to confirm that the payload satisfies criteria for each of the code-based validation rules.

Each rule in the set of code-based validation rules 404-420 is declaratively defined to specify a rule that an incoming message must comply with to be successfully validated. In this example, two schema validation rules 406, 408 are specified along with five field value validation rules 412-420 that are used in conjunction with the schema validation rules 406, 408.

The schema validation rules 406, 408 are used to specify a constraint about a schema of each incoming message that must be satisfied for that incoming message to be successfully validated (e.g., a schema of each incoming message is evaluated to ensure compliance with the schema validation rule). The schema defines, for example, a structure and type of contents for each data element within the incoming message.

In this particular example, the schema validation rule 406 is used to specify whether each incoming message is allowed to include extra fields in addition to those defined in the "matchers" section 410 (that are required), and is set to false meaning that each incoming message is not allowed to include extra fields for validation of the incoming message to be successful. The schema validation rule 408 is used to specify whether each incoming message is allowed to have missing fields that are specified in the "matchers" section 410, and is set to false meaning that each incoming message must have each of fields specified in the "matchers" section for validation of the incoming message to be successful. This is an example of an exact match schema that is configured for an "exact match" validation and the specific fields that are required are listed under the "matchers" section at 410. By contrast, although not illustrated in FIG. 4A, if the schema validation rule 408 (that is used to specify whether each incoming message is allowed to have missing fields that are specified in the "matchers" section 410), has been set to true, then this would mean that any of the fields listed under "matchers" could be missing and the message would still be valid as long as the ones that are included had values that still satisfied the defined field validation rules.

Each of the field validation rules 412-420 are used to define a constraint about a value for a field of each incoming message that must be satisfied for that incoming message to be successfully validated. With field value rules, a value for a field of each incoming message is evaluated to ensure compliance with each field value validation rule. In this particular example, the field validation rule 412 is used to specify that a consumerid field of each incoming message must have a value that contains only the characters a-z, A-Z or 0-9 and is exactly 26 characters long (i.e., [a-zA-Z0-9]{26}). The field validation rule 414 is used to specify that a siteid field of each incoming message must have a value that contains any characters and is anywhere from 1-60 characters long (i.e., \\w{1,60}). The field validation rule 416 is used to specify that a cartid field of each incoming message must have a value that contains only the characters a-z, A-Z or 0-9 and is exactly 26 characters long (i.e., [a-zA-Z0-9]{26}). The field validation rule 418 is used to specify that activity date field of each incoming message must have a value that matches a date string in YYYY-MM-DDTHH:mm:ss:mmm format (i.e., ^(\\d{4}-\\d{2}-\\d{2}T\\d{2}:\\d{2}(\\:\\d{3}:)?)$. The field validation rule 420 is used to specify that a message identifier field must exist, but that it can have any value, including a null value.

Referring again to FIG. 1, the message stream processing engine 120 can be implemented using hardware-based processor(s) and memory (or other non-transitory, computer-readable medium) that includes processor-executable instructions encoded on a non-transient processor-readable media. The processor-executable instructions, when executed by the hardware-based processor(s) during runtime, cause the system to perform various operations and steps described above to process a stream of incoming messages sent from a specific combination of input message source 110 and target system 160.

Figure 5:
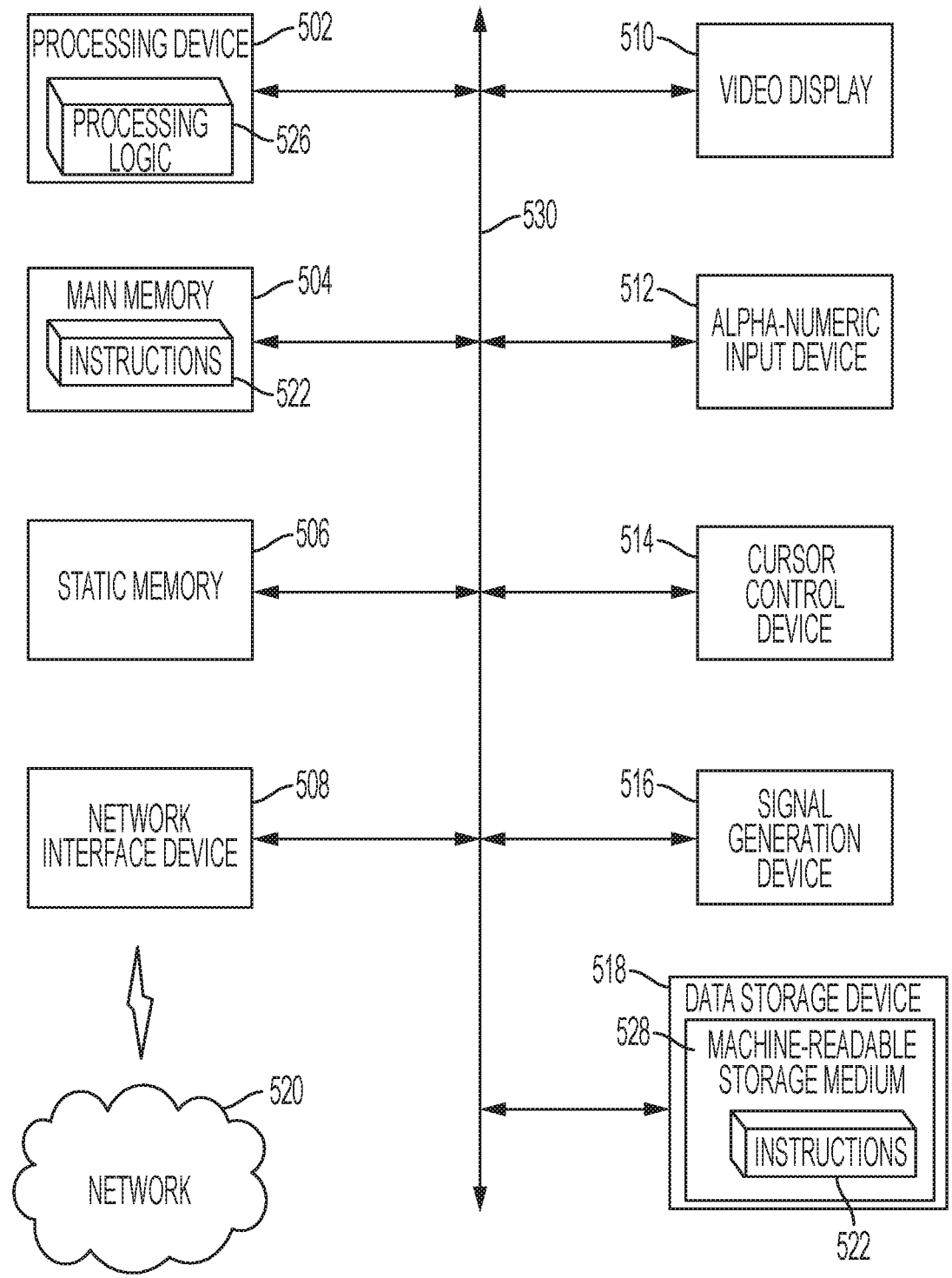
FIG. 5 illustrates a diagrammatic representation of a machine in the exemplary form of a computer system within which a set of instructions, for causing the machine to perform any one or more of the methodologies discussed herein, may be executed.

FIG. 5 illustrates a diagrammatic representation of a machine in the exemplary form of a computer system 500 within which a set of instructions, for causing the machine to perform any one or more of the methodologies discussed herein, may be executed. The system 500 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be server hardware, a personal computer (PC), a set-top box (STB), a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes one or more processing devices (processor(s)) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 518, which communicate with each other via a bus 530.

Processing device(s) 502 represent one or more general-purpose processing devices such as a microprocessor, central processing unit, or the like. More particularly, the processing device(s) 502 may be one or more instances of complex instruction set computing (CISC) microprocessors, reduced instruction set computing (RISC) microprocessors, very long instruction word (VLIW) microprocessors, or a processor implementing other instruction sets or processors implementing a combination of instruction sets. The processing device(s) 502 may also be one or more special-purpose processing devices such as an application specific integrated circuit (ASIC), a field programmable gate array (FPGA), a digital signal processor (DSP), network processor, or the like.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable medium 528 on which is stored one or more sets of instructions 522 embodying any one or more of the methodologies or functions described herein. The instructions 522 may also reside, completely or at least partially, within the main memory 504 and/or within processing logic 526 of the processing device 502 during execution thereof by the computer system 500, the main memory 504 and the processing device 502 also constituting computer-readable media. The instructions may further be transmitted or received over a network 520 via the network interface device 508.

While the computer-readable storage medium 528 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for processing a stream of incoming messages sent from a specific input message source and validating each incoming message of that stream at run-time via a declarative stream processing pipeline before sending processed message results to a specific target system, the method comprising:
    declaring a plurality of code-based validation rules that are to be applied to validate the stream of incoming messages from the specific input message source to the specific target system, wherein each of the plurality of code-based validation rules are declaratively-defined to specify a rule that an incoming message must comply with to be successfully validated, wherein a payload of each incoming message includes a set of fields each having a value, wherein the set of fields is a schema for that incoming message and the values within the fields are content of that incoming message;
    at a message stream processing engine:
    assembling, at run-time based on a pipeline definition having a declared configuration for the specific input message source and the specific target system, the declarative stream processing pipeline, wherein assembling comprises loading a message validation module for the pipeline definition that comprises the plurality of code-based validation rules that define the declarative stream processing pipeline; and
    applying the plurality of code-based validation rules to each incoming message that is received to validate or invalidate each incoming message for schema and content of that incoming message, wherein the plurality of code-based validation rules are collectively used to validate a payload of each incoming message to confirm that the payload satisfies criteria for each of the code-based validation rules.

2. The method according to claim 1, wherein assembling, at run-time based on a pipeline definition having a declared configuration for the specific input message source and the specific target system, the declarative stream processing pipeline, comprises:
    receiving the message validation module for the pipeline definition;
    loading the message validation module; and
    assembling, based on the pipeline definition, the declarative stream processing pipeline;
    wherein applying the plurality of code-based validation rules at run-time to each incoming message that is received to validate or invalidate each incoming message comprises:
    executing the message validation module at the message stream processing engine to evaluate each of the incoming messages against each of the plurality of code-based validation rules to either validate or invalidate each incoming message,
    wherein each incoming message that satisfies all of the validation rules is validated and output to a message handler, and wherein any incoming messages that fail to satisfy one or more of the validation rules is prevented from being output to the message handler.

3. The method according to claim 1, wherein at least one of the plurality of code-based validation rules is a schema validation rule used to specify a constraint about a schema of each incoming message that must be satisfied for that incoming message to be successfully validated, the method further comprising:
    for each incoming message: evaluating a schema of that incoming message to ensure compliance with the schema validation rule, wherein the schema validation rule defines one or more of:
    at least one field that is required to be present in each incoming message, at least one field that is allowed to be present in each incoming message, and at least one field that is not allowed to be present in each incoming message.

4. The method according to claim 3, wherein at least one of the plurality of code-based validation rules is: a field value validation rule used to define a constraint about a value for at least one field of each incoming message that must be satisfied for that incoming message to be successfully validated, the method further comprising:
    for each incoming message: evaluating a value for at least one field of that incoming message to ensure compliance with the field value validation rule.

5. The method according to claim 1, wherein at least one of the plurality of code-based validation rules complies with:
    an exact match schema that declares that schema of an incoming message must exactly match a schema defined by that validation rule for validation to be successful, wherein the schema defines a structure and type of contents for each data element within the incoming message.

6. The method according to claim 1, wherein at least one of the plurality of code-based validation rules complies with:
    an at least schema declares that an incoming message must include fields defined in the validation rule for validation of the incoming message to be successful, and that the incoming message is permitted to include other fields not defined in the validation rule while still allowing for validation of the incoming message to be successful.

7. The method according to claim 1, wherein at least one of the plurality of code-based validation rules complies with:
    an at most schema that declares that any fields in an incoming message must exist in and conform to the validation rule for validation of the incoming message to be successful, and that not all fields declared in the validation rule are required to exist in the incoming message for validation of the incoming message to be successful.

8. The method according to claim 1, wherein the message stream processing engine is configurable to operate with a number of different input message sources and a number of different target systems, and
    wherein each combination of a specific input message source and a specific target system corresponds to a specific pipeline definition that is used to define a specific instance of the declarative stream processing pipeline that is to be applied to validate incoming messages from the specific input message source to the specific target system,
    wherein each specific instance of the declarative stream processing pipeline comprises a specific set of code-based validation rules that are declaratively defined for that particular combination of the specific input message source and the specific target system.

9. The method according to claim 8, wherein the input message source comprises one of:
    a message queue; message broker software; a log file; an Application Programming Interface (API) endpoint; and a distributed stream-processing platform; and
    wherein the target system comprises one of:
    another message queue; another log file; another Application Programming Interface (API) endpoint; and a database table that the processed message results are to be inserted into.

10. A system comprising at least one hardware-based processor and memory, wherein the memory comprises processor-executable instructions encoded on a non-transient processor-readable media, wherein the processor-executable instructions, when executed by the hardware-based processor, cause the system to:

declare a plurality of code-based validation rules that are to be applied to validate a stream of incoming messages sent from a specific input message source to a specific target system, wherein each of the plurality of code-based validation rules are declaratively-defined to specify a rule that an incoming message must comply with to be successfully validated, wherein a payload of each incoming message includes a set of fields each having a value, wherein the set of fields is a schema for that incoming message and the values within the fields are content of that incoming message;

at a message stream processing engine:

assemble, at run-time based on a pipeline definition having a declared configuration for the specific input message source and the specific target system, a declarative stream processing pipeline, wherein assembling comprises loading a message validation module for the pipeline definition that comprises plurality of code-based validation rules that define the declarative stream processing pipeline defined by the plurality of code-based validation rules; and apply the plurality of code-based validation rules to each incoming message that is received to validate or invalidate each incoming message for schema and content of that incoming message, wherein the plurality of code-based validation rules are collectively used to validate a payload of each incoming message to confirm that the payload satisfies criteria for each of the code-based validation rules.

11. The system according to claim 10, wherein at least one of the plurality of code-based validation rules is a schema validation rule used to specify a constraint about a schema of each incoming message that must be satisfied for that incoming message to be successfully validated, and wherein the processor-executable instructions are further capable of causing the system to:

evaluate, for each incoming message, a schema of that incoming message to ensure compliance with the schema validation rule, wherein the schema validation rule defines one or more of:

at least one field that is required to be present in each incoming message, at least one field that is allowed to be present in each incoming message, and at least one field that is not allowed to be present in each incoming message.

12. The system according to claim 11, wherein at least one of the plurality of code-based validation rules is: a field value validation rule used to define a constraint about a value for at least one field of each incoming message that must be satisfied for that incoming message to be successfully validated, and wherein the processor-executable instructions are further capable of causing the system to:

evaluate, for each incoming message, a value for at least one field of that incoming message to ensure compliance with the field value validation rule.

13. The system according to claim 10, wherein each of the plurality of code-based validation rules complies with:

an exact match schema that declares that schema of an incoming message must exactly match a schema defined by that validation rule for validation to be successful, wherein the schema defines a structure and type of contents for each data element within the incoming message;

an at least schema declares that an incoming message must include fields defined in the validation rule for validation of the incoming message to be successful, and that the incoming message is permitted to include other fields not defined in the validation rule while still allowing for validation of the incoming message to be successful; and an at most schema that declares that any fields in an incoming message must exist in and conform to the validation rule for validation of the incoming message to be successful, and that not all fields declared in the validation rule are required to exist in the incoming message for validation of the incoming message to be successful.

14. The system according to claim 10, wherein the message stream processing engine is configurable to operate with a number of different input message sources and a number of different target systems, and wherein each combination of a specific input message source and a specific target system corresponds to a specific pipeline definition that is used to define a specific instance of the declarative stream processing pipeline that is to be applied to validate incoming messages from the specific input message source to the specific target system, wherein each specific instance of the declarative stream processing pipeline comprises a specific set of code-based validation rules that are declaratively defined for that particular combination of the specific input message source and the specific target system.

15. The system according to claim 14, wherein the input message source comprises one of:

a message queue; message broker software; a log file; an Application Programming Interface (API) endpoint; and a distributed stream-processing platform; and wherein the target system comprises one of:

another message queue; another log file; another Application Programming Interface (API) endpoint; and a database table that a processed message results are to be inserted into.

16. A non-transitory, computer-readable medium containing instructions thereon for processing a stream of incoming messages sent from a specific input message source and validating each incoming message of that stream before sending processed message results to a specific target system, wherein the instructions, which, when executed by one or more hardware processors are configurable to perform a method comprising:

declaring a plurality of code-based validation rules that are to be applied to validate the stream of incoming messages, wherein each of the plurality of code-based validation rules are declaratively-defined to specify a rule that an incoming message must comply with to be successfully validated, wherein a payload of each incoming message includes a set of fields each having a value, wherein the set of fields is a schema for that incoming message and the values within the fields are content of that incoming message; and at a message stream processing engine:

assembling, at run-time based on a pipeline definition having a declared configuration for the specific input message source and the specific target system, a declarative stream processing pipeline, wherein assembling comprises loading a message validation module for the pipeline definition that comprises the plurality of code-based validation rules that define the declarative stream processing pipeline; and applying the plurality of code-based validation rules at run-time to each incoming message that is received to validate or invalidate each incoming message for schema and content of that incoming message, wherein the plurality of code-based validation rules are collectively used to validate a payload of each incoming message to confirm that the payload satisfies criteria for each of the code-based validation rules.

17. The method according to claim 1, further comprising:

outputting only the incoming messages that were successfully validated to a message handler of the message stream processing engine;

invalidating other incoming messages that fail to satisfy one of the plurality of code based validation rules such that those other incoming messages are filtered out and prevented from being processed at the message handler;

processing, at the message handler, each incoming message that was successfully validated to transform that incoming message into the processed message result that corresponds to that incoming message, wherein each incoming message that was that successfully validated satisfied each of the plurality of code-based validation rules; and sending each of the processed message results to the specific target system.

18. The system according to claim 10, wherein the processor-executable instructions, when executed by the hardware-based processor, further cause the system to:

output the incoming messages that were successfully validated to a message handler of the message stream processing engine;

invalidate other incoming messages that fail to satisfy one of the plurality of code-based validation rules such that those other incoming messages are filtered out and prevented from being processed at the message handler;

process, at the message handler, each incoming message that was successfully validated to transform that incoming message into a processed message result that corresponds to that incoming message, wherein each incoming message that was that successfully validated satisfied each of the plurality of code-based validation rules; and send each of the processed message results to the specific target system.

19. The non-transitory, computer-readable medium according to claim 16, the method further comprising:

outputting only the incoming messages that were successfully validated to a message handler of the message stream processing engine;

invalidating other incoming messages that fail to satisfy one of the plurality of code based validation rules such that those other incoming messages are filtered out and prevented from being processed at the message handler;

processing, at the message handler, each incoming message that was successfully validated to transform that incoming message into the processed message result that corresponds to that incoming message, wherein each incoming message that was that successfully validated satisfied each of the plurality of code-based validation rules; and sending each of the processed message results to the specific target system.

* * * * *

UNITED STATES PATENT AND TRADEMARK OFFICE
CERTIFICATE OF CORRECTION

PATENT NO. : 11,157,337 B2
APPLICATION NO. : 16/259826
DATED : October 26, 2021
INVENTOR(S) : Steven Joseph Crouse and Charles Cox It is certified that error appears in the above-identified patent and that said Letters Patent is hereby corrected as shown below:

In the Claims

Column 18, Line 24, cancel the text beginning with "6. The method" to and ending "successful." in Column 18, Line 32, and insert the following claim:
--6. The method according to claim 1, wherein at least one of the plurality of code-based validation rules complies with:
  an at least schema that declares that an incoming message must include fields defined in the validation rule for validation of the incoming message to be successful, and that the incoming message is permitted to include other fields not defined in the validation rule while still allowing for validation of the incoming message to be successful.--

Column 19, Line 63, cancel the text beginning with "13. The system" to and ending "successful." in Column 20, Line 17, and insert the following claim:
--13. The system according to claim 10, wherein each of the plurality of code-based validation rules complies with:
  an exact match schema that declares that schema of an incoming message must exactly match a schema defined by that validation rule for validation to be successful, wherein the schema defines a structure and type of contents for each data element within the incoming message;
  an at least schema that declares that an incoming message must include fields defined in the validation rule for validation of the incoming message to be successful, and that the incoming message is permitted to include other fields not defined in the validation rule while still allowing for validation of the incoming message to be successful; and
  an at most schema that declares that any fields in an incoming message must exist in and conform to the validation rule for validation of the incoming message to be successful, and that not all fields declared in the validation rule are required to exist in the incoming message for validation of the incoming message to be successful.--

Signed and Sealed this
Fifteenth Day of February, 2022

Drew Hirshfeld
*Performing the Functions and Duties of the
Under Secretary of Commerce for Intellectual Property and
Director of the United States Patent and Trademark Office*